United States Patent
Nonaka

(10) Patent No.: US 9,905,329 B2
(45) Date of Patent: Feb. 27, 2018

(54) INSULATED ELECTRIC WIRE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Tsuyoshi Nonaka, Mie (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 15/543,740

(22) PCT Filed: Jan. 9, 2016

(86) PCT No.: PCT/JP2016/050589
§ 371 (c)(1),
(2) Date: Jul. 14, 2017

(87) PCT Pub. No.: WO2016/121469
PCT Pub. Date: Aug. 4, 2016

(65) Prior Publication Data
US 2018/0005725 A1      Jan. 4, 2018

(30) Foreign Application Priority Data

Jan. 30, 2015 (JP) ................. 2015-016693

(51) Int. Cl.
*H01B 7/00* (2006.01)
*H01B 3/44* (2006.01)
*H01B 7/02* (2006.01)
*C08F 214/26* (2006.01)

(52) U.S. Cl.
CPC ........... *H01B 3/44* (2013.01); *C08F 214/262* (2013.01); *H01B 7/02* (2013.01)

(58) Field of Classification Search
CPC .......... C08F 18/20; C08F 16/24; C08F 14/18; C08F 27/14

USPC .............. 174/110 R, 110 PM, 113 R, 120 R, 174/120 SR, 121 R, 121 SR, 36; 526/242, 247, 421; 428/422; 524/544; 166/65.1
See application file for complete search history.

(56) References Cited

U.S. PATENT DOCUMENTS

| | | | | |
|---|---|---|---|---|
| 3,083,238 | A * | 3/1963 | Hauptschein | ......... C07C 17/204 106/11 |
| 4,381,387 | A * | 4/1983 | Sulzbach | .............. C08F 210/02 428/421 |
| 2009/0192259 | A1* | 7/2009 | Colaianna | ........... C08F 214/184 524/544 |
| 2015/0060104 | A1* | 3/2015 | Colaianna | .............. H01B 7/292 174/105 R |

FOREIGN PATENT DOCUMENTS

| | | |
|---|---|---|
| JP | 2011018634 A | 1/2011 |
| JP | 2013175462 A | 9/2013 |
| JP | 2014028953 A | 2/2014 |
| JP | 2015514299 A | 5/2015 |

OTHER PUBLICATIONS

International Search Report for Application No. PCT/JP2016/050589 dated Feb. 9, 2016, 4 pages.
International Preliminary Report on Patentabiltiy for Application No. PCT/JP2016/050589, 6 pages.

* cited by examiner

*Primary Examiner* — William H Mayo, III
(74) *Attorney, Agent, or Firm* — Reising Ethington, P.C.

(57) ABSTRACT

A insulated electric wire having an insulating layer containing a fluororesin, the insulated electric wire having a high flexibility with the heat resistance of the fluororesin maintained. The insulated electric wire is obtained by covering a conductor with an insulating layer containing a copolymer of a monomer expressed by a Formula (1) and a monomer expressed by a Formula (2). It is preferable that a copolymerization ratio of the monomer expressed by Formula (2) in the copolymer is at least 10 mass %. Note that Rf represents a perfluoroalkyl group including one or more ether bonds in its structure.

4 Claims, No Drawings

INSULATED ELECTRIC WIRE

CROSS REFERENCE TO RELATED APPLICATIONS

This application claims the priority of Japanese patent application JP2015-016693 filed on Jan. 30, 2015, the entire contents of which are incorporated herein.

TECHNICAL FIELD

The present invention relates to an insulated electric wire, and specifically to an insulated electric wire that is suitably used in a vehicle such as an automobile.

BACKGROUND ART

A fluororesin having excellent heat resistance and chemical resistance is sometimes used as an insulating material of an insulated electric wire used in a vehicle such as an automobile. An example of such can be found in JP2011-18634A.

SUMMARY

Examples of a conventionally known fluororesin include polytetrafluoroethylene (PTFE), and copolymers of tetrafluoroethylene and perfluoroalkoxy trifluoroethylene (PFA). These resins have excellent heat resistance but have poor flexibility. Thus, these resins can be used as an insulating material of a small-diameter electric wire, but it is difficult to apply these resins to an insulating material of a thick power cable or the like due to their insufficient flexibility.

If fluorocarbon rubber, which has better flexibility than fluororesin, is used as the insulating material, then vulcanization (crosslinking) is required in order to obtain the qualities that make it usable as rubber, and its productivity deteriorates due to this vulcanization (closslinking) step and its manufacturing cost increases. Also, the concentration of fluorine decreases due to a vulcanizing agent (crosslinking agent) or a vulcanizing aid (crosslinking aid) that is used in vulcanization (crosslinking), and thus there is also a risk that its heat resistance will decrease.

An object of the present application is to provide a highly flexible insulated electric wire having an insulating layer containing fluororesin whose heat resistance is maintained.

In order to resolve the above-described issue, an insulated electric wire is obtained by covering a conductor with an insulating layer containing a copolymer of a monomer expressed by Formula (1) below and a monomer expressed by Formula (2) below,

where Rf represents a perfluoroalkyl group including one or more ether bonds in its structure.

The monomer expressed by Formula (2) above is preferably a monomer expressed by Formula (3) below,

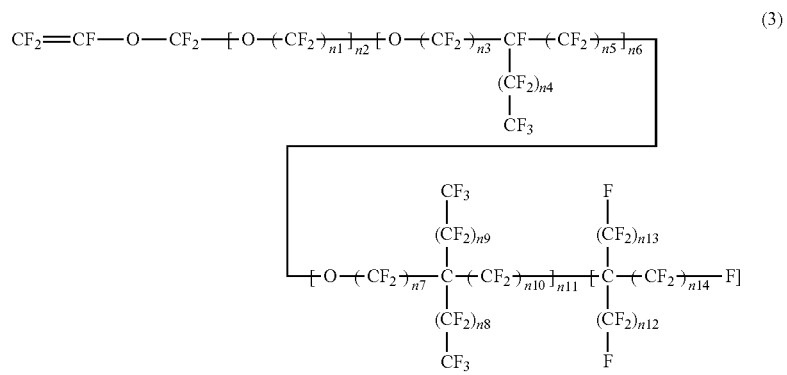

where n1 to n14 represent an integer of at least 0, but n1 to n11 are not all 0.

It is preferable that all of the n1 to n14 are an integer of at least 0 and not more than 10. It is preferable that a copolymerization ratio of the monomer expressed by Formula (2) above in the copolymer is at least 10 mass %. It is preferable that the copolymer is thermoplastic.

The insulated electric wire according to the present application is obtained by covering a conductor with an insulating layer containing a copolymer of a monomer expressed by Formula (1) above and a monomer expressed by Formula (2) above, and thus its flexibility can be increased while the heat resistance of the fluororesin is maintained. Because a flexible fluororesin is used as an insulating material, the flexibility of a thick electric wire such as a power cable can be ensured. The above-described copolymer is a perfluoroalkyl compound, and thus the copolymer has an excellent heat resistance improvement effect and provides the insulating layer with excellent heat resistance.

If the copolymerization ratio of the monomer expressed by Formula (2) in the copolymer is at least 10 mass %, the copolymer has a significant flexibility increasing effect. If the copolymer is not obtained through crosslinking using a vulcanizing agent or a vulcanizing aid, and it is thermoplastic, it is possible to suppress a decrease in heat resistance caused by the vulcanizing agent or the vulcanizing aid and to suppress a decrease in its productivity.

DESCRIPTION OF EMBODIMENTS

Next, an embodiment will be described in detail.

An insulated electric wire according to the present application includes a conductor and an insulating layer for covering this conductor. The insulating layer contains a fluororesin constituted by a specific copolymer.

The specific copolymer is a copolymer of a monomer expressed by Formula (1) below and a monomer expressed by Formula (2) below.

$$CF_2=CF_2 \qquad (1)$$

$$CF_2=CF-O-CF_2-R_f \qquad (2)$$

Note that Rf represents a perfluoroalkyl group including one or more ether bonds in its structure. In this case, from the viewpoint of increasing flexibility, Rf preferably has at least 2 carbon atoms. Rf more preferably has at least 3 carbon atoms.

A specific example of the monomer expressed by Formula (2) above is a monomer expressed by Formula (3) below.

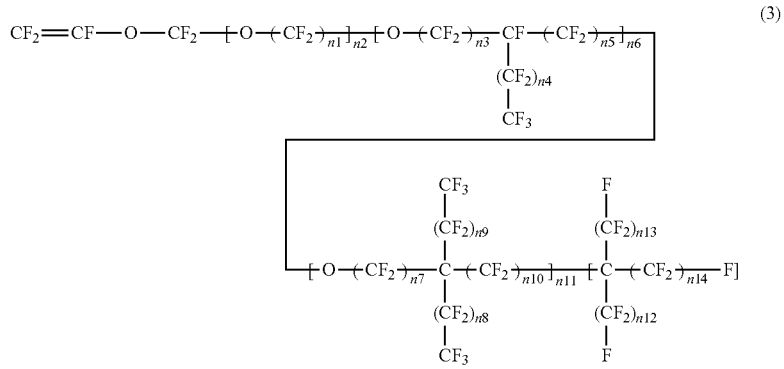

(3)

Note that n1 to n14 represent an integer of at least 0, but n1 to n11 are not all 0. If n1 to n11 were all 0, then Rf would not include at least one ether bond in its structure. Also, from the viewpoint of the structure of Rf including at least one ether bond, it is preferable to exclude those cases where n2, n6, and n11 are all 0. That is, it is preferable that any one of n2, n6, and n11 is at least an integer of at least 1. Also, from the viewpoint of Rf having a least 2 carbon atoms, the monomer expressed by Formula (3) above preferably has at least 5 carbon atoms. Also, from the viewpoint of excluding a peroxy compound in which Rf has at least 2 carbon atoms, if n2 is not 0 (i.e. an integer of at least 1), then it is preferable that n1 is not 0 (i.e. an integer of at least 1).

In the monomer expressed by Formula (3) above, Rf is divided into a first linear structural block including at least one ether bond, a second structural block that includes at least one ether bond and has a branched chain that branches from one carbon atom in only one direction, a third structural block that includes at least one ether bond and has a branched chain that branches from one carbon atom in two directions, and a fourth structural block that includes a perfluoroalkyl chain that includes no ether bond. The first structural block is contained in first brackets, and the number of its repeating units is n2. The second structural block is contained in second brackets, and the number of its repeating units is n6. The third structural block is contained in third brackets, and the number of its repeating units is n11. The fourth structural block is contained in fourth brackets, and the number of its repeating units is 1.

In general, the tetrafluoroethylene of Formula (1) can be synthesized by pyrolyzing chlorodifluoromethane obtained through reaction between chloroform and hydrogen fluoride.

The monomer of Formula (2) can be synthesized through reaction between tetrafluoroethylene and perfluoroalkylether alcohol with a palladium catalyst, or a nickel catalyst, for example.

Similarly to a method for synthesizing polytetrafluoroethylene, the above-described specific copolymer can be synthesized by emulsion polymerization. Specifically, different types of monomers are blended in a predetermined mass ratio, and the specific copolymer can be synthesized through emulsion polymerization. Quaternary ammonium salts of a carboxylic acid having a fluorinated allyl ether chain, fluorine-containing carboxylic acid and its salts, fluorine-containing sulfonates, or the like can be used as an emulsifying agent. Ammonium persulfate, potassium persulfate, tert-butylhydroperoxide, potassium permanganate/oxalic acid, disuccinic acid peroxide, or the like can be used as a polymerization initiator.

The monomers expressed by Formulae (1) and (2) are perfluoroalkyl compounds, and the above-described specific copolymer, which is the copolymer (two-dimensional copolymer) of these compounds, is a perfluoroalkyl compound. The perfluoroalkyl compound is an alkyl compound obtained by substituting all of the hydrogen atoms bonded to all carbon atoms with fluorine atoms. This compound has no C—H bond, and all of the C—H bonds are substituted with C—F bonds. Thus, the specific copolymer has excellent heat resistance.

In the specific copolymer, the O—$CF_2$—Rf group (perfluoroalkoxy group) of Formula (2) is its side chain. In this manner, because a certain amount of the monomer having a perfluoroalkoxy substituent is polymerized, the crystallinity of the specific copolymer decreases compared to polytetrafluoroethylene (PTFE). Accordingly, its flexibility increases. Also, the specific copolymer has a longer side chain than the copolymer of tetrafluoroethylene and perfluoroalkoxy trifluoroethylene (PFA), and the side chain has a larger volume than the copolymer. Thus, its crystallinity is lower than PFA and its flexibility is higher than PFA. Therefore, its flexibility can be increased while the heat resistance of the fluororesin is maintained.

From the viewpoint of enhancing its flexibility increasing effect due to a decrease in crystallinity, it is preferable that the above-described specific copolymer has a high copolymerization ratio of the monomer of Formula (2). The copolymerization ratio of the monomer of Formula (2) is preferably at least 10 mass %, more preferably at least 15 mass %, and even more preferably at least 30 mass %. On the other hand, from the viewpoint of an increase in its flexibility due to a decrease in crystallinity, there is no particular limitation to the upper limit of the copolymerization ratio of the monomer of Formula (2), but from the viewpoint of suppressing a decrease in its copolymerization speed, the copolymerization ratio of the monomer of Formula (2) is preferably not more than 95 mass %, more preferably not more than 93 mass %, and even more preferably not more than 90 mass %.

From the viewpoint of enhancing its flexibility increasing effect due to a decrease in its crystallinity, the specific copolymer has a greater number of carbon atoms in the O—$CF_2$—Rf group (perfluoroalkoxy group) of Formula (2), which is the side chain. Therefore, the number of repeating units (n2, n6, or n11) in a structural block that is included in the monomer of Formula (3) or the number of repeating units (n1, n3, n4, n5, n7, n8, n9, n10, n12, n13, or n14) included in a structural block that is included in the monomer of Formula (3) are preferably high. The number of repeating units in the included structural block or the number of included repeating units in the included structural block is at least 1, preferably at least 2, and more preferably at least 3. On the other hand, from the viewpoint of increasing its flexibility due to a decrease in its crystallinity, there is no particular limitation to the upper limit of the above-described number of repeating units (n1 to n14), but from the viewpoint of easily synthesizing the monomer of Formula (3), the number of repeating units (n1 to n14) is preferably an integer of not more than 10 if the repeating units are included. The number of repeating units is more preferably an integer of not more than 9, even more preferably an integer of not more than 8, an integer of not more than 7, an integer of not more than 6, and an integer of not more than 5.

It is preferable that the specific copolymer is thermoplastic. That is, it is preferable that the specific copolymer is not obtained through crosslinking using a vulcanizing agent or a vulcanizing aid. If the specific copolymer is not obtained through crosslinking using a vulcanizing agent or a vulcanizing aid and the specific copolymer is thermoplastic, it is possible to suppress a decrease in heat resistance caused by the vulcanizing agent or the vulcanizing aid and to suppress a decrease in its productivity.

The insulating layer is made from a resin composition containing the above-described specific copolymer. Although this resin composition may also contain polymer components other than the specific copolymer to some extent that the heat resistance and flexibility of the insulated electric wire are not affected, when the heat resistance and flexibility of the insulated electric wire are considered, it is preferable that this resin composition may contain no polymer component other than the specific copolymer. Note that from the viewpoint of excellent electric wire properties, examples of the polymer component other than the specific copolymer include polyethylene, polypropylene, ethylene-vinyl acetate copolymer (EVA), and ethylene-ethyl acrylate copolymer (EEA).

The above-described resin composition can be blended with various additives, which are to be blended into an electric wire coating material, other than polymer components such as the specific copolymer. Examples of this type of additive include a flame retardant, a processing aid, a lubricant, an ultraviolet absorbing agent, an antioxidant, a stabilizer, and a filler.

Examples of the filler include calcium carbonate, barium sulfate, clay, talc, magnesium hydroxide, and magnesium oxide. These compounds increase the wear resistance of the above-described resin composition. From the viewpoint of the dispersiveness in the resin composition, the average particle size of a filler is preferably not more than 1.0 µm. Also, from the viewpoint of handling, the average particle diameter of a filler is preferably at least 0.01 µm. The average particle size of the filler can be measured through laser light scattering.

From the viewpoint of excellent wear resistance, the content of the filler is preferably at least 0.1 parts by mass with respect to 100 parts by mass of polymer components such as the specific copolymer. The content of the filler is more preferably at least 0.5 parts by mass, and even more preferably at least 1.0 parts by mass. On the other hand, from the viewpoint of suppressing deterioration of its external appearance and ensuring its flexibility and cold resistance, the content of the filler is preferably not more than 100 parts by mass with respect to 100 parts by mass of the polymer components such as the specific copolymer. The content of the filler is more preferably not more than 50 parts by mass, and even more preferably not more than 30 parts by mass.

From the viewpoint of suppressing aggregation and increasing the affinity with the specific copolymer, the filler may also be subjected to surface treatment. Examples of a surface treatment agent include homopolymers of α-olefins such as 1-heptene, 1-octene, 1-nonene, and 1-decene, mutual copolymers thereof, mixtures thereof, fatty acids, rosin acid, and silane coupling agents.

The above-described fatty acid may also be modified. Unsaturated carboxylic acid and its derivatives can be used as a denaturant. Specific examples of the unsaturated carboxylic acid include maleic acid and fumaric acid. Examples of the derivative of unsaturated carboxylic acid include maleic anhydride (MAH), maleic acid monoesters, and maleic acid diesters. In these derivatives, maleic acid and maleic anhydride are preferable, for example. Note that these denaturants for the surface treatment agent may be used alone or in combination of two or more.

Examples of a method for introducing acid to the surface treatment agent include grafting and a direct method. Also, 0.1 to 20 mass %, more preferably 0.2 to 10 mass %, and even more preferably 0.2 to 5 mass % of the surface treatment agent are preferable as the acid modification amount.

There is no particular limitation to the surface treatment using a surface treatment agent. For example, the filler may be subjected to surface treatment or may be treated simultaneously when the filler is synthesized. Also, wet processing in which a solvent is used or dry processing in which no solvent is used may be used as a processing method. During wet processing, aliphatic solvents such as pentane, hexane, and heptane, aromatic solvents such as benzene, toluene, and xylene, and the like can be used as a suitable solvent. Also, when the resin composition for the insulating layer is prepared, the surface treatment agent may be kneaded simultaneously with the materials such as the specific copolymer.

Calcium carbonate includes synthetic calcium carbonate produced through a chemical reaction and heavy calcium carbonate produced by crushing limestone. The synthetic calcium carbonate can be used as minute particles having a primary particle diameter, which is not more than submicron length (about several tens nm), through surface treatment using a surface treatment agent such as fatty acids, rosin acid, or a silane coupling agent. The average particle size of minute particles that were subjected to surface treatment is expressed by the primary particle diameter. The primary particle diameter can be measured through electron microscopy. The heavy calcium carbonate is a crushed product, needs not to be subjected to surface treatment using a fatty acid, and can be used as particles having an average particle size of about several hundred nm to 1 µm. The synthetic calcium carbonate or the heavy calcium carbonate can also be used as calcium carbonate.

Specific examples of calcium carbonate include Hakuenka CC (average particle size=0.05 µm), Hakuenka CCR (average particle size=0.08 μm), Hakuenka DD (average particle size=0.05 μm), Vigot10 (average particle size=0.10 μm), Vigot15 (average particle size=0.15 μm), and Hakuenka U (average particle size=0.04 μm) that are produced by SHIRAISHI CALCIUM KAISHA, LTD.

Specific examples of magnesium oxide include UC95S (average particle size=3.1 μm), UC95M (average particle size=3.0 μm), and UC95H (average particle size=3.3 μm) that are produced by Ube Material Industries, Ltd.

Synthetic magnesium hydroxide synthesized by growing crystals from sea water or synthesized by reaction between magnesium chloride and calcium hydroxide, natural magnesium hydroxide obtained by crushing minerals produced naturally, or the like can be used as magnesium hydroxide. Specific examples of magnesium hydroxide as the filler include UD-650-1 (average particle size=3.5 μm) and UD653 (average particle size=3.5 μm) that are produced by Ube Material Industries, Ltd.

The insulating layer can be formed as follows, for example. That is, first, the above-described resin composition for an insulating layer for forming the insulating layer is prepared. Next, the insulating layer containing the specific copolymer is formed around a conductor by extruding the prepared resin composition around the conductor. The above-described resin composition may be prepared by kneading the specific copolymer and an additive that is blended with as needed, such as a filler. When the components of the resin composition are kneaded, an ordinary kneader such as a banbury mixer, a pressure kneader, a kneading extruder, a twin screw extruder, or a roll may be used, for example.

An electric wire extrusion molding machine that is used to manufacture an ordinary insulated electric wire can be used in extrusion molding of the resin composition for an insulating layer. A conductor used in an ordinary insulated electric wire can be utilized. Examples of the conductor include a conductor constituted by a single wire made of a copper-based material or an aluminum-based material, and a conductor constituted by a twisted wire made of such materials. Also, there is no particular limitation to the diameter of the conductor or the thickness of the insulating layer, and can be determined as appropriate in accordance with the purposes of the insulated electric wire.

Although an embodiment was described in detail above, the present invention is not merely limited to the above-described embodiment, and it will be appreciated that various modifications can be made without departing from the gist of the present invention. For example, although the insulated electric wire having the above-described aspect includes a single insulating layer, the insulated electric wire of the present invention may also include two or more insulating layers.

The insulated electric wire according to the present invention can be used as an insulated electric wire used in automobiles, electronic devices, and electric devices. In particular, because the insulated electric wire has a high flexibility with the heat resistance of a fluororesin maintained, this insulated electric wire is suitable as an insulated electric wire applied to an object that needs heat resistance and flexibility. An example of such an insulated electric wire includes a power cable. Because the power cable is for connecting an engine of a hybrid car or an electric car and a battery and electricity with a high voltage and a large electric current flows through the power cable, a relatively thick insulated electric wire is used. Thus, the power cable needs to have a high heat resistance and excellent flexibility, even though the power cable is thick.

The cross-sectional area of a conductor of an insulated electric wire having a relatively long diameter that is suitable as a power cable and the like is at least 3 mm². In this case, the thickness of the insulating layer is set as appropriate in accordance with the cross-sectional area of the conductor. For example, if the cross-sectional area of the conductor is 3 mm², then the thickness of the insulating layer is at least 0.5 mm. Also, if the cross-sectional area of the conductor is 15 mm², then the thickness of the insulating layer is at least 1.0 mm.

The insulated electric wire has a high flexibility with the heat resistance of a fluororesin maintained. Its flexibility can be evaluated by the flexural modulus of the above-described specific copolymer used as the insulating material. The flexural modulus is a numerical value measured in an absolute dry condition at a temperature of 23° C., in conformity with "Plastics—Determination of flexural properties" in ISO178 (ASTM-D790). From the viewpoint of satisfying the flexibility of the insulated electric wire, the flexural modulus of the specific copolymer is preferably not more than 200 MPa. Its flexural modulus is more preferably not more than 150 MPa, and even more preferably not more than 100 MPa.

WORKING EXAMPLES

Hereinafter, working examples and comparative examples will be described.

Working Examples 1 to 10

The monomer (tetrafluoroethylene (TFE)) of Formula (1) above and the monomer of Formula (3) above were prepared such that polymerization ratios (parts by mass) shown in Table 1 were achieved, and a predetermined fluororesin (perfluoroalkyl compound) was synthesized through emulsion polymerization. A resin composition for an insulating layer was prepared by mixing the obtained fluororesin and a filler that was added as needed such that the blend composition (parts by mass) shown in Table 1 was achieved. Next, the resin composition for an insulating layer was extruded (350° C.) using an extrusion molding machine to cover the outer circumference of a conductor (with a cross-sectional area of 15 mm²) constituted by an annealed copper twisted wire obtained by twisting 171 annealed copper wires with a thickness of 1.1 mm. As described above, the insulated electric wires of Working Examples 1 to 10 were obtained. The monomers of Formula (3) of Working Examples 1 to 10 respectively had Formulae (4) to (13) below. The monomers of Formula (3) of Working Examples 1 to 10 were synthesized utilizing known chemical reactions. Perfluoroalkylether monomer was obtained through reaction between tetrafluoroethylene and the corresponding perfluoroalkylether alcohol (perfluoroethoxymethoxymethyl alcohol in Formula (4)) using a palladium catalyst in a deuterated THF solvent at 100° C. for 4 hours. Perfluoroalkylether alcohol was obtained through oligomerization and fluorination using hexafluoropropylene oxide or tetrafluorooxetane as a staring raw material.

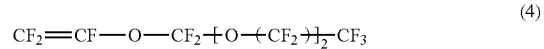

(4)

(5)

(6)

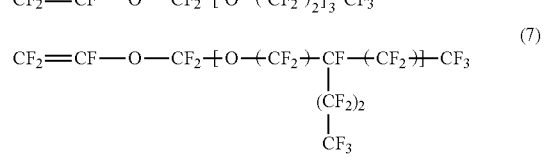

(7)

-continued

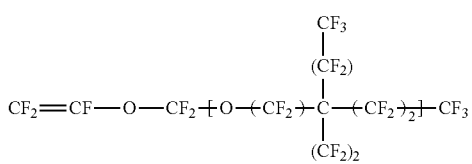
(8)

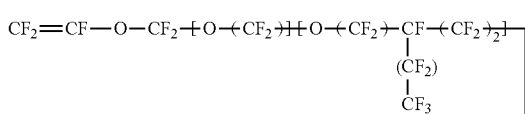
(9)

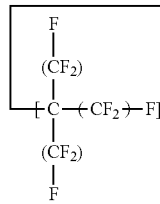

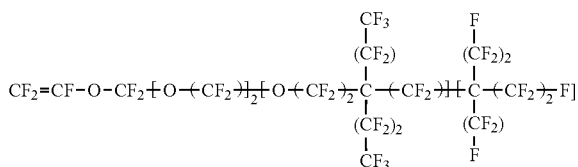
(10)

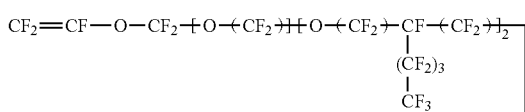
(11)

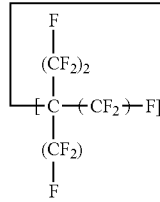

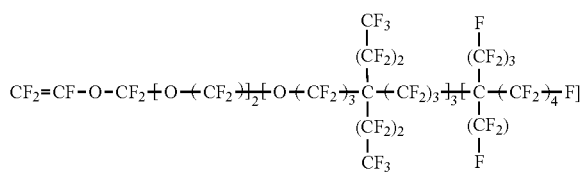
(12)

-continued

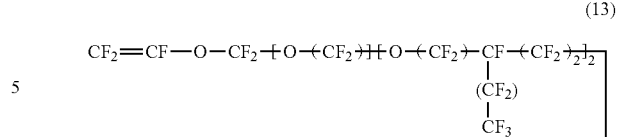
(13)

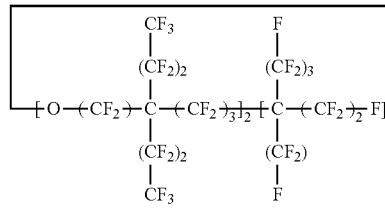

Comparative Examples 1 to 7

The insulated electric wires of Comparative Examples 1 to 7 were obtained similarly to the working examples, except that the monomer (tetrafluoroethylene (TFE)) of Formula (1) above and the monomer ($CF_2CFOC_nF_{2n+1}$) shown in Table 2 were prepared such that the polymerization ratios (parts by mass) shown in Table 2 were achieved. The number of carbon atoms of a side chain (perfluoroalkoxy group) is represented as an n number in Table 2. Also, the structure of a carbon chain in the side chain (perfluoroalkoxy group) is represented as a linear chain.

Comparative Examples 8

The insulated electric wire of Comparative Example 8 was obtained as the fluororesin (perfluoroalkyl compound), similarly to the working examples except that a commercially available PFA ("420HP-J" produced by Du Pont-Mitsui, side chain=methoxy group) was used.

The flexibility of the insulated electric wires of Working Examples 1 to 10 and Comparative Examples 1 to 8 was evaluated. Also, their wear resistance was evaluated. The results are shown in Tables 1 and 2. Note that the test methods and evaluation are as follows.

Flexibility Test Method

The insulated electric wires of the working examples and comparative examples were cut to a length of 500 mm and used as test pieces, and fixed at a bending radius of 100 mm. Next, stress was applied using a load cell, and the maximum load was measured when the insulated electric wire was pushed until the bending radius was 50 mm.

Wear Resistance Test Method

The wear resistance test was performed using a blade reciprocating method in accordance with the standard "JASO D618" of Society of Automotive Engineers of Japan. Specifically, the insulated wires of the working examples and comparative examples were cut to a length of 750 mm and used as test pieces. A blade was reciprocated on the coating material (insulating layer) of the test piece in a length of at least 10 mm at a speed of 50 times per minute in the axial direction at room temperature of 23±5° C., and the number of reciprocations was counted until the blade reached the conductor. In that case, the load applied to the blade was set to 7 N. If the number of reciprocations was at least 1500, the test piece was evaluated as acceptable "O", whereas if the number of reciprocations was less than 1500, the test piece was evaluated as not acceptable "x". Also, if the number of reciprocations was at least 2000, the test piece was evaluated as particularly excellent "⊚".

TABLE 1

| | Working Examples | | | | | | | | | |
|---|---|---|---|---|---|---|---|---|---|---|
| | 1 | 2 | 3 | 4 | 5 | 6 | 7 | 8 | 9 | 10 |
| TFE (parts by mass) | 89 | 84 | 80 | 55 | 40 | 15 | 85 | 78 | 72 | 67 |
| Monomer of Formula (3) (parts by mass) | 11 | 16 | 20 | 45 | 60 | 85 | 15 | 22 | 28 | 33 |
| Specific structural formula | formula (4) | formula (5) | formula (6) | formula (7) | formula (8) | formula (9) | formula (10) | formula (11) | formula (12) | formula (13) |
| n1 | 1 | 2 | 2 | 0 | 0 | 1 | 1 | 1 | 1 | 1 |
| n2 | 2 | 2 | 3 | 0 | 0 | 1 | 2 | 1 | 2 | 1 |
| n3 | 0 | 0 | 0 | 1 | 0 | 1 | 0 | 1 | 0 | 1 |
| n4 | 0 | 0 | 0 | 2 | 0 | 1 | 0 | 3 | 0 | 1 |
| n5 | 0 | 0 | 0 | 1 | 0 | 2 | 0 | 1 | 0 | 2 |
| n6 | 0 | 0 | 0 | 1 | 0 | 1 | 0 | 2 | 0 | 2 |
| n7 | 0 | 0 | 0 | 0 | 1 | 0 | 2 | 0 | 3 | 1 |
| n8 | 0 | 0 | 0 | 0 | 2 | 0 | 2 | 0 | 2 | 2 |
| n9 | 0 | 0 | 0 | 0 | 1 | 0 | 1 | 0 | 2 | 2 |
| n10 | 0 | 0 | 0 | 0 | 2 | 0 | 1 | 0 | 3 | 3 |
| n11 | 0 | 0 | 0 | 0 | 1 | 0 | 1 | 0 | 3 | 2 |
| n12 | 0 | 0 | 0 | 0 | 0 | 1 | 1 | 1 | 1 | 1 |
| n13 | 0 | 0 | 0 | 0 | 0 | 1 | 2 | 2 | 3 | 3 |
| n14 | 0 | 0 | 0 | 0 | 0 | 1 | 2 | 1 | 4 | 2 |
| Hakuenka CC UC95S | | | | | | | | | 5 | 10 |
| Flexibility (N) | 29 | 27 | 25 | 22 | 19 | 13 | 15 | 14 | 10 | 12 |
| Wear resistance | ○ | ○ | ○ | ○ | ○ | ○ | ○ | ○ | ⊚ | ⊚ |

TABLE 2

| | Comparative Examples | | | | | | | |
|---|---|---|---|---|---|---|---|---|
| | 1 | 2 | 3 | 4 | 5 | 6 | 7 | 8 |
| TFE (parts by mass) | 95 | 94 | 93 | 92 | 91 | 91 | 89 | |
| $CF_2CFOC_nF_{2n+1}$ (parts by mass) | 5 | 6 | 7 | 8 | 9 | 9 | 11 | |
| (n number) | 1 | 2 | 3 | 3 | 3 | 3 | 3 | |
| (carbon chain) | Linear | linear | linear | linear | linear | linear | linear | |
| PFA (420HP-J) | | | | | | | | 100 |
| UD-650-1 | | | | | 5 | | | |
| Flexibility (N) | 55 | 52 | 48 | 43 | 41 | 44 | 40 | 53 |
| Wear resistance | ⊚ | ⊚ | ⊚ | ⊚ | ○ | ⊚ | ○ | ⊚ |

Comparative Example 8 was obtained using a commercially available PFA as the material of the insulating layer. The commercially available PFA was unsatisfactory in terms of its flexibility. Comparative Examples 1 to 7 were obtained using fluororesins, as the material of the insulating layer, which was constituted by perfluoroalkyl compounds having side chains (perfluoroalkoxy groups) with carbon atoms of 1 to 3. These were unsatisfactory in terms of their flexibility. In contrast, the working examples were obtained using a fluororesin, as the material of the insulating layer, which was constituted by a specific perfluoroalkyl compound in which the volume of the side chain is larger than that of PFA. Thus, the working examples were satisfactory in terms of their flexibility. Also, the working examples included the fluororesin constituted by a perfluoroalkyl compound, and thus their heat resistance was significantly high. Thus, according to the working examples, the higher the copolymerization ratio of the monomer of Formula (2) above in the fluororesin is, and the higher the number of carbon atoms in the side chain of the fluororesin is, its flexibility tends to increase. Moreover, if the copolymerization ratio of the monomer of Formula (2) above in the fluororesin is at least 10 mass %, its flexibility is particularly high.

Although an embodiment of the present invention was described in detail above, the present invention is not merely limited to the above-described embodiment, and it will be appreciated that various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An insulated electric wire obtained by covering a conductor with an insulating layer containing a copolymer of a monomer expressed by Formula (1) below and a monomer expressed by Formula (2) below, a copolymerization ratio of the monomer expressed by Formula (2) in the copolymer being at least 10 mass %, the copolymer being thermoplastic and not being crosslinked,

$$CF_2\!=\!CF_2 \quad (1)$$

$$CF_2\!=\!CF\!-\!O\!-\!CF_2\!-\!R_f \quad (2)$$

where Rf represents a perfluoroalkyl group including one or more ether bonds in its structure.

2. The insulated electric wire according to claim 1, wherein the monomer expressed by Formula (2) above is a monomer expressed by Formula (3) below,

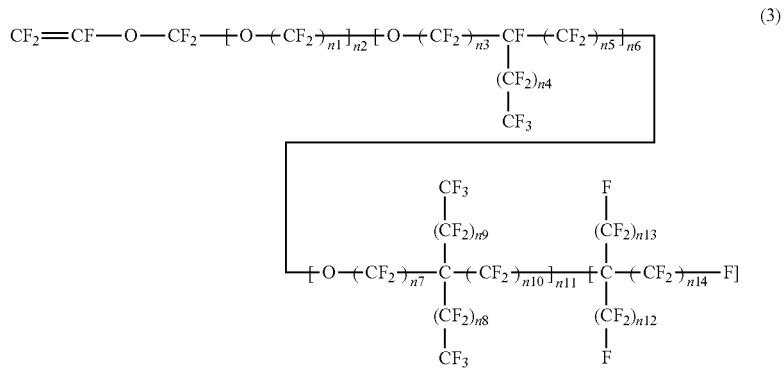
(3)
where n1 to n14 represent an integer of at least 0, but n1 to n11 are not all 0.
3. The insulated electric wire according to claim 2, wherein all of the n1 to n14 are an integer of at least 0 and not more than 10.
4. The insulated electric wire according to claim 1, wherein a copolymerization ratio of the monomer expressed by Formula (2) in the copolymer is at least 15 mass %.
* * * * *